United States Patent [19]

Knudson

[11] Patent Number: 5,254,521
[45] Date of Patent: Oct. 19, 1993

[54] LEONARDITE CHAR ADSORBENTS

[75] Inventor: Curtis L. Knudson, Grand Forks, N. Dak.

[73] Assignee: University of North Dakota Energy and Environment Research Center Foundation, Grand Forks, N. Dak.

[21] Appl. No.: 896,333

[22] Filed: Aug. 3, 1992

[51] Int. Cl.$^5$ ...... C01B 31/10; C01B 31/08; B01D 53/02
[52] U.S. Cl. .............................. 502/432; 423/244.01; 502/416; 502/437; 95/129; 95/137
[58] Field of Search ................ 502/430, 432, 437, 416

[56] References Cited

U.S. PATENT DOCUMENTS

| | | | |
|---|---|---|---|
| 3,716,969 | 2/1973 | Maeda | 55/390 |
| 3,727,376 | 4/1973 | Shirmay | 55/60 |
| 3,998,933 | 12/1976 | Henderson et al. | 423/448 |
| 4,023,939 | 5/1977 | Jiintgen et al. | 55/73 |
| 4,039,473 | 8/1977 | Schafer | 502/427 |
| 4,042,353 | 8/1977 | Warda et al. | 55/99 |
| 4,047,906 | 9/1977 | Murakami et al. | 55/390 |
| 4,083,701 | 4/1978 | Noack | 55/20 |
| 4,133,660 | 1/1979 | Steiner | 55/387 |
| 4,149,858 | 4/1979 | Noack et al. | 55/73 |
| 4,255,166 | 3/1981 | Gernand et al. | 55/3 |
| 4,318,824 | 3/1982 | Turner | 252/421 |
| 4,461,629 | 7/1984 | Arisaki | 48/210 |
| 4,552,863 | 11/1985 | Fujimori | 502/418 |
| 4,566,882 | 1/1986 | Hoffman et al. | 55/100 |
| 4,595,575 | 6/1986 | Oeste et al. | 423/210 |
| 4,603,119 | 7/1986 | Karl et al. | 502/427 |
| 4,671,803 | 6/1987 | Suggitt | 48/197 R |
| 4,725,290 | 2/1988 | Ohlmeyer et al. | 55/77 |
| 4,734,273 | 3/1988 | Haskell | 423/219 |
| 4,855,116 | 8/1989 | Richter et al. | 423/239 |
| 4,921,831 | 5/1990 | Nakai et al. | 502/430 |
| 5,002,741 | 3/1991 | Hooper | 423/239 |
| 5,015,362 | 5/1991 | Chin | 208/121 |

FOREIGN PATENT DOCUMENTS

| | | |
|---|---|---|
| 0042174 | 12/1981 | European Pat. Off. . |
| 0363613 | 4/1990 | European Pat. Off. ............ 502/432 |
| 2902018 | 1/1979 | Fed. Rep. of Germany . |
| 0043777 | 4/1977 | Japan . |
| 0113760 | 4/1978 | Japan . |
| 0112378 | 9/1979 | Japan . |
| 0189024 | 11/1983 | Japan . |

OTHER PUBLICATIONS

Kassebohm, "Combustion Without Air Pollution: The Semi-Dry Flue Gas Cleaning Process, 'System Dusseldorf'", EC-vol. 2, Integrating Environmental Controls and Energy Production—ASME 1991 pp. 35-42.

Kassebohm, "The Semi-Dry Flue Gas Desulphurization System Dusselforf"Seminar: The Institute of Energy, London Sep. 19, 1990.

Stadtwerke Dusseldorf, AG Brochure "Utilization of Lignite Coke In Flue Gas Purification" May 1987.

*Primary Examiner*—Paul E. Konopka
*Attorney, Agent, or Firm*—Zarley, McKee, Thomte, Voorhees & Sease

[57] ABSTRACT

A process of preparing lignite (low rank) coal filter material, suitable for use in lieu of more expensive activated carbon filter materials, is disclosed. The process comprises size reducing Leonardite coal material to a suitable filtering effective size, and thereafter heating the size reduced Leonardite preferably to at least 750° C. in the presence of a flow of an inert gas.

7 Claims, 1 Drawing Sheet

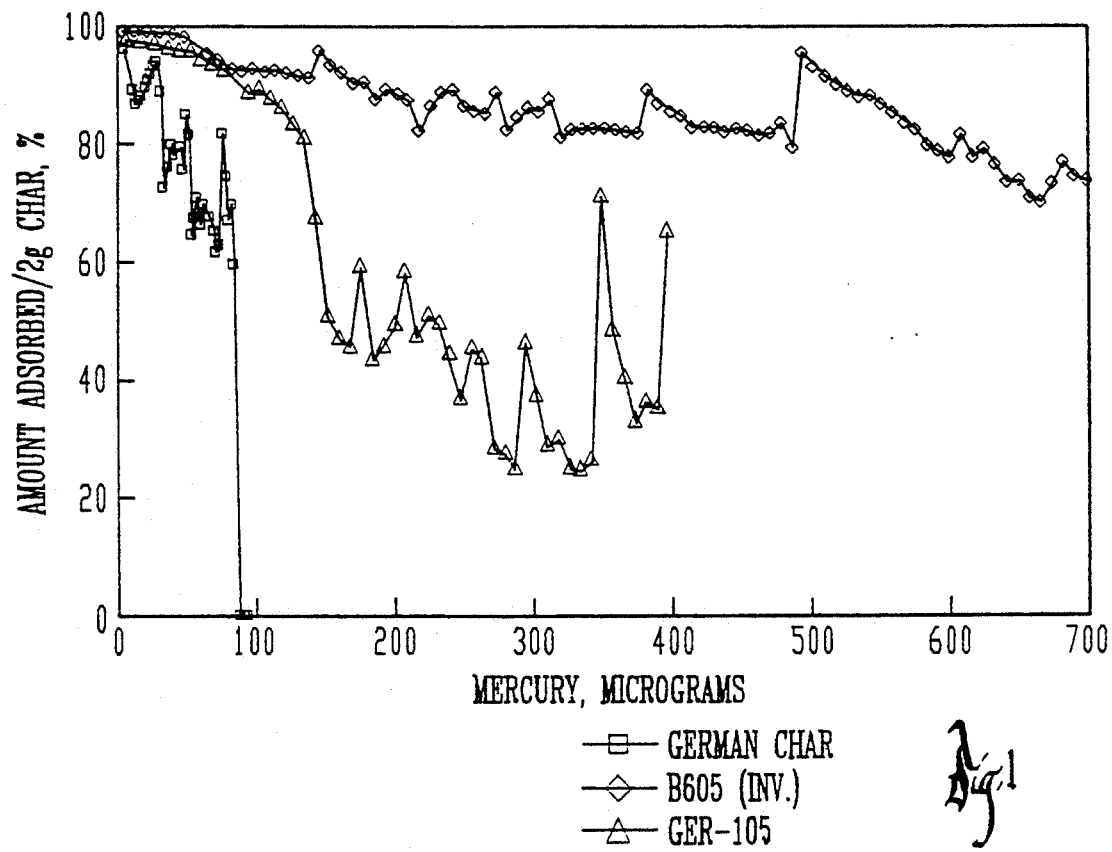

LEONARDITE CHAR ADSORBENTS

GRANT REFERENCE

This invention was made in part with Government support under Cooperative Agreement DE-FC21-86MC10637 with the Department of Energy. The Government has certain rights in the invention.

BACKGROUND OF THE INVENTION

Lignite is the youngest, most chemically reactive species of the family of coals found throughout the world. Typically low in ash and sulfur but high in volatile matter, United States lignites have moisture contents in the range of 30-40% and carbon levels of 40-50%. Lignites are surface mined, principally in North Dakota and Texas, with approximately 110 million tons mined in 1990. North Dakota has over 80% of the lignite in the continental U.S. with a total resource in excess of 500 billion tons.

Lignite char is produced by heating raw lignite at temperatures sufficient to drive off most of the water (>400° C.) and the other volatile materials (tar oils). In this process, known as "carbonization," the remaining char particles become highly porous as the volatile liquids are driven off. The resulting chars typically have carbon contents in the range of 59-82%; ash contents of 9-28%; and 5-12% volatile matter.

In the past, conventional thinking was that lignite chars, that is low rank chars, could not be used for making effective filters, primarily because of their high moisture content and their typically, as tested, lack of high adsorption capacity, particularly for materials developed in power station fuel-gas, such as sulfur dioxide, nitrogen oxides and heavy metal ions, such as mercury. Nevertheless, there has been some prior work with lignite in general as a possible char adsorbent. In particular, activated carbons and char adsorbents from "brown coal" and lignite have been produced for several decades. A material known as F-Coal was produced in the former German Democratic Republic and a similar S-Coal was produced in the USSR dating back to the 1950's. These were made from "brown coal", semi-coke by activation with a steam and $CO_2$ mixture. Their principal application was for desulfurization applications. An activated carbon known as Darco, derived from Texas lignite, has been produced by the Atlas Chemical Company in the U.S. Presently, the largest known producer of lignite char/coke for adsorbent applications is Rheinbraun AG of Köln, Germany. The char is produced from the brown coal of the Rhine Valley region and sold principally as a flue-gas sorbent in a process developed jointly with Stadtwerke AG.

Technical work on lignite char adsorbents and activated carbons dates back to the early part of the century at the University of North Dakota. A 1937 report by C. R. Bloomquist, "The Production of Activated Carbon from Lignite," summarizes work by University of North Dakota researchers and others on early attempts to produce a good adsorbent from lignite feedstocks.

A 1963 study by Thelan investigated the feasibility of producing an activated carbon from North Dakota lignite in a fluidized bed reactor. Carbonized lignite was reacted with steam at elevated temperatures up to 950° C. Amick and lavine and, in a separate study, Cooley had conducted earlier trials in producing an activated carbon for comparison against the Darco product being produced by the Atlas Chemical Company from Texas lignite. Their initial trials had yielded a product which gave a benzoic acid adsorption considerably higher than that of Darco.

Batch tests by Thelan indicated that steam activation became significant at temperatures over 540° C. with increasing benefit up to 1040° C. (the limit of his equipment). At the upper limit of activation, the activated char from North Dakota lignite had greater adsorption capacity than one of the Darco products, but less than a second product. The optimal conditions, based on limited testing, appeared to be produced by activation at 950° C. with a particle size of −40, +60 mesh, a steam rate lower than 0.35 ft$^3$/min, and a char feed rate of 300 gm/hr into a fluid bed reactor.

In 1969, an unpublished thesis study by Schroeder focused on "The Production of Activated Carbon from North Dakota Leonardite." The goal of the study was to assess the adsorptivity potential of an activated carbon produced from a North Dakota Leonardite. Since Leonardite has lost much of its structural integrity, relative to lignite, the study focused on producing a granular activated carbon using a method of colloidal suspension and precipitation followed by drying to yield hard dense granules. A method of pelletizing powdered Leonardite by spraying a 5% solution of sodium hydroxide onto the powdered Leonardite in a rotating drum was investigated.

The Schroeder study produced a Leonardite activated carbon with a bulk density of 0.5 gm/ml in a 8-14 mesh size. Carbonization was carried out at 294° C. followed by cooling by a water mist and then activation in a steam environment at 925° C. The maximum adsorptive power was displayed from a pelletized Leonardite with a zinc chloride additive yielding a higher adsorptive level than Darco S-51 (Texas lignite based) and 60% of Columbia Grade C (coconut shell based).

The study recommended using zinc chloride and calcium hydroxide before briquetting to increase the adsorptive properties. Likewise a precarbonization step before briquetting may enhance granule strength.

In 1970, McNally prepared another thesis entitled, "Activated Carbon from North Dakota Lignite," designed to determine the prevailing factors in the activation process. A lignite-based activated carbon was produced which demonstrated an iodine adsorption capacity of 0.725 gm/gm C compared to 0.55 gms/gm C for a commercial Texas lignite char being produced at the time. The study concluded that the effects of activation residence time ranging between 6-24 minutes has a greater impact on adsorption capacity than activation temperatures in the range of 775°-950° C.

The study recommended the use of a fluidized bed reactor for activation and the reduction of ash from the char by leaching. The study also suggested that future studies should investigate the direct activation of raw and dried lignite and that lignites from different mines be characterized for adsorption capacity.

With the general advent of desulfurization systems for industrial and utility emissions control in the 1970's and 1980's, more attention was given to finding low-cost feedstocks for producing adsorbent carbons. Kassebohm, et al. 14th Annual Lignite Symposium, pp 2 A1:1-16, 1987, described the work of Stadtwerke AG in using brown coal chars in fluegas adsorbers in the Rhine Valley region of the Federal Republic of Germany. G. Q. Lu and D. D. Do, Carbon Vol. 29, NO.2, pp 207-213, 1991, also report preparation of a sorbent for $SO_2$ and $NO_x$ removal using coal washery reject in Australia. This solid waste material generated in coal preparation processes was pyrolyzed at around 550° C. and then activated with carbon dioxide at 900° C.

Lu and Do reported using carbonaceous sorbents prepared from these wastes to remove $SO_2$ at 100°–200° C. resulting in sulfuric acid production. After the $SO_2$ removal stage, the flue-gas was cooled down to around 25°–50° C. to achieve primarily $NO_2$ and subsequent adsorption on the char. The $NO_2$ was then desorbed at 200°–350° C. to generate a gas stream of concentrated carbon dioxide, nitrogen, NO, and CO. The NO is then catalytically reduced in the presence of CO. The equations are as follows:

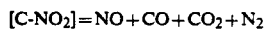

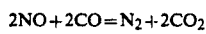

This process replaces the use of expensive sorbents like mixed metal oxides and activated carbons without using ammonia at the expense of using some carbon in the $NO_x$ reduction mechanism.

Tests conducted in producing chars from this waste material showed an optimal carbonization temperature of 565° C. at four hours and followed by activation with $CO_2$ at 900° C. $NO_x$ adsorption was increased by nearly a factor of two with activation, whereas $SO_2$ adsorption for this material was not significantly affected. The study by Lu and Do demonstrated the importance of pyrolysis and activation temperatures in developing the optimum porous infrastructure prior to activation. The washery waste may become an economically viable flue-gas adsorber material.

In summary, the literature highlights the need to identify the optimal carbonization temperature which yields the maximum porosity infrastructure prior to any activation process. This temperature will be specific to the carbon feedstock but usually lies in the range of 400°–600° C. Activation by steam or carbon dioxide is usually optimized in the range of 850°–950° C. Slower carbonization processes at lower temperatures tend to yield a more porous infrastructure by driving off nearly all the volatiles without consuming the carbon. The optimal activation temperature will gasify surface carbon to the extent that the pores produced in carbonization are increased in size without consolidating them resulting in a loss of internal surface area.

Nearly all studies to date indicate enhanced adsorption of particularly $SO_2$ and $NO_x$ in the presence of basic surface oxygen radicals. The presence of alkaline ash, while not as decisive, also tends to be positive by further disrupting the graphitic-like surfaces of carbon thereby creating additional basic adsorption points.

It can be seen from the above described state of the art, that while there have been some processes developed for producing chars from lignite, none have been successful in producing a lignite char that has the full range of capability of far more expensive activated carbon, particularly from the standpoint of developing a filter char which can be used particularly as a carbonaceous sorbent for sulfur dioxide and nitrogen oxide removals, particularly in power plant flue-gas streams.

Accordingly, it is a primary objective of the present invention to produce a carbon adsorbent material from low rank coal with an optimized adsorption capacity for oxides of sulfur and nitrogen and also heavy metals (i.e. mercury, cadmium, lead, etc.). It also adsorbs volatile organic compounds including the elements which make up dioxins and furans.

Another objective of the present invention is to provide carbon adsorbents of the above described undesirable pollutants that have the capacity to nearly completely remove these chemical substances from flue-gas and industrial process streams to achieve full compliance with environmental regulations.

Another objective of the present invention is to provide an inexpensive carbonaceous absorbent material which can fully compete with more expensive activated carbons in price, and at the same time, provide at least as efficient filtration, and in many instances, more efficient filtration than the more expensive activated carbons.

The method and manner of achieving the above objectives will become apparent from the description of the invention given hereinafter. It will be apparent to those of ordinary skill in the art that certain modifications can be made in the process and conditions hereinafter described and yet still achieve the objectives of the present invention.

SUMMARY OF THE INVENTION

The invention consists of the identification and processing of a specific lignitic material, Leonardite, to assure that it will have a high display of adsorption capacities for sulfur dioxide and nitric oxides compared to more expensive, commercially available carbonized char products such as activated carbon and as well the lignite coke material available from Stadtwerke Dusseldorf Ag of Dusseldorf, Germany. In the process of the present invention the Leonardite is size reduced and thereafter heated to at least 750° C. in the presence of a flow of an inert gas.

BRIEF DESCRIPTION OF THE DRAWINGS

FIG. 1 is a plot showing the effectiveness of the Leonardite char of the present invention, in removing flue-gas pollutant materials, in comparison with conventional lignite.

DETAILED DESCRIPTION OF THE INVENTION

Carbon adsorption is driven by two phenomenon: (a) physical attraction between the adsorbent and the adsorbate (van der Wall forces), and (b) chemical bonding (chemisorption). The first occurs nearly instantaneously upon physical contact and results in a weak bond subject to equilibrium forces and thermal excitation; the second process is slower but results in a stronger bond subject to the chemical reactivity of the two substances.

Organic materials which have undergone carbonization typically have a hexagonal, graphite-like, crystalline carbon structure overladen with amorphous carbon and hydrocarbon molecules. These energetically richer carbon atoms at the outcropping boundaries of the crystalline lattice layers tend to bind products of thermal decomposition during carbonization; form centers where impurities concentrate by diffusion at high temperatures; and provide sites where molecules of polar substances are adsorbed. In the case of lignite, these sites attract the non-crystalline carbon, hydrogen, hydrocarbons, and carboxyl groups found in the raw material.

Producing a strong absorbent involves maximizing the number of unfilled, energetic, carbon boundary sites. Adsorption is further enhanced by optimizing the pore structure within the individual char particles providing maximum internal surface area and greater accessibility of the adsorbate to the active sites.

"Physical activation" by oxidizing agents such as steam physically removes the hydrocarbons adsorbed at border lattice sites. Oxidation consequently increases the surface area and enlarges the pore volume within the char by "(a) burning away the carbon atoms from the walls of open pores and (b) by perforating closed pores thereby providing access to pores formed initially without an inlet." "Chemical activation" can be achieved by introducing other materials such as mineral salts (i.e. zinc chloride) which alter the structure of the carbon lattice resulting in both additional and chemically enhanced adsorptive sites.

Adsorptivity is closely linked to the crystalline structure of the char. Activation produces a variety of pore shapes which are generically classified as micropores, transitional micropores, and macropores. The macropores tend to form at the surface of a char particle with the transitional micropores branching radially yielding access to the internal micropores.

Micropores with effective radii less than ~20 A and specific volumes of 0.15–0.50 ml/g have the greatest impact on adsorptivity. Their combined surface area is at least 95% of the total specific surface area of the char. Transitional micropores have effective radii of 20–1000 A and specific volumes of 0.02–0.10 ml/g. While they contribute less than 5% to the total specific area, they play a major role in controlling the rate of adsorption as they tend to serve as access "gatekeepers" to the micropores. Macropores have effective radii greater than 1000 A, typically within 5000–20,000 A, with specific volumes between 0.02–0.10 ml/g. Surface areas of macropores range from 0.5–2.0 m²/g. The most desirable activation method will open and expand the maximum number of micropores and transitional micropores.

Two additional mechanisms substantially impact adsorption and may be particularly important in the case of lignite char.

First, ash has a catalytic effect on carbon adsorption. Acting naturally in a manner similar to induced "chemical activation", ash constituents cause defects in the elementary structure of the carbon. At these defects, oxygen is chemisorbed leading to increased adsorption of polar substances such as sulfur dioxide and water vapor. Second, oxygen and hydrogen play important roles in determining adsorptivity.

As indicated above, hydrogen, oxygen, and other heteroatoms in carbonaceous materials tend to form at the edges and corners of the elementary graphitic crystals. These energetically richer carbon atoms tend to (a) form centers where impurities concentrate by diffusion, (b) probably serve as sites where molecules of polar substances are absorbed, and (c) reduce the mobility of physically adsorbed nitrogen.

The oxygen content of the feedstock has been shown to have considerable impact on adsorptivity of the resulting char or activated carbon. Some of these impacts include:

(1) High oxygen feedstocks tend to have appreciable smaller distances between the parallel graphitic layers.

(2) Oxygen content in the feedstock tends to determine the optimal carbonization temperature.

(3) The adsorption capacity of carbonaceous materials for polar and easily polarized gases and vapors has been shown to be dependent on feedstock oxygen levels.

(4) Oxygen levels, together with carbonization temperatures, determine the amount and type of oxides formed on the internal surfaces of the carbon absorbent.

The adsorptivity of a carbonaceous adsorbent for a particular gaseous or liquid adsorbate can be characterized by an adsorption isotherm. An adsorption isotherm plots the volume of gas removed by adsorption from the vapor phase against the equilibrium pressure of the adsorbate in the gaseous phase. These isotherms are determined experimentally for each carbon adsorbent.

As heretofore mentioned, while the overall processing of lignite carbon adsorbents is somewhat similar to existing activated carbon adsorbent processing, it has the distinct advantage that the cost of production is inherently less, perhaps up to 10–20 times less than selected activated carbons used to absorb the same amount of similar materials. Moreover, conventional thinking in the past was that lignite carbon adsorbents would not be as effective and therefore the higher cost for activated carbon such as that produced from carbonized coconut shells by bituminous coals or other vegetative matter was therefore justified.

Surprisingly, it has been discovered that in accordance with the present invention, providing that certain critical process conditions are utilized, lignite chars can be prepared which in fact have a higher adsorbency than normally available activated carbons, at least for certain specific pollutants normally present in flue-gas such as sulfur dioxide, nitrogen oxides, and heavy metals such as mercury, cadmium, lead, etc. In particular, a specific lignite char which will achieve this is made from Leonardite.

It is not precisely known why Leonardite works as a specific material for use in the present invention, but it is believed that it is because Leonardite differs significantly from other lignite type materials. In particular, Leonardite has a very high oxygen content in comparison with conventional lignite. Lignites are generally thought of as having an oxygen content within the range of 20–25%, whereas Leonardite has an oxygen content within the range of 30–35%. Moreover, Leonardite is different in nature that conventional lignite in that its high oxygen content is achieved from a natural "weathering action". This weathering process, that is a long term slow oxidation process, produces a more porous material that has a higher carboxylic acid functionality. The higher carboxylic acid functionality is important, because in subsequent processing the carboxylic acid functionality is far more labile than other oxygenated functionalities such as the carbonyl group. During the hereinafter described carbonation process, the carboxylic acid functionality, being more labile, gives off carbon dioxide and provides a substantial availability of free radical cites for high reactivity centers. In contrast, conventional lignite char and other activated char materials has the oxygen bound in far higher incidence of carbon groups. The carbon groups when activated by carbonization tend to cause polymerization rather that loss of carbon dioxide. As a result there is a significantly lower incidence of activated free radical cites. In addition, the use of Leonardite has an additional advantage besides producing higher availability of free radical reactive cites. This results from the nature of the carboxylic acid group, which as earlier described, liberates carbon dioxide during carbonization. The deliberation of the carbon dioxide provides a more porous structure and also opens channels for remaining mineral material. That is to say, the carbon dioxide removal during the carbonizing or heating process provides an open channel (or pathway) as the carbon dioxide exits. This channel (or pathway) provides a direct means of access for the flue-gas pollutants to the reactive cites during filtration.

The process conditions which allow achieving the above identified advantages with use of Leonardite for the material fairly specific set of conditions. In particular, the best Leonardite char material is achieved when the carbonization temperature used is at least 750° C. Generally the temperature range must be within the range of from 550° C. to 850° C. Carbonization or heating must be in a manner which does not simply combust the material. Therefore it should occur in the presence of an inert gas. The most suitable inert gases for use in the process of the present invention have been found to be inert gas, such as argon or nitrogen.

In accordance with the carbonization process of the present invention, the Leonardite is first size reduced to a suitable flue-gas filtration size material. Such size will generally be within the range of from 1 mm to about 5 mm in diameter. Such size reduction can be accomplished in standard well known coal crushing devices.

Thereafter, the size reduced Leonardite material is next heated in inert atmosphere, preferably at a temperature of from about 700° C. to about 800° C. The hold time in the inert atmosphere will generally range from about 0.25 hours to about 1.0 hours, preferably from 0.33 hour to about 0.5 hour. Suitable reactors in which the carbonization heating process can occur are the well known fluidized bed reactors.

The char was prepared by size reduction to the range 10×30 mesh mm in a coal crusher, followed by heating to 750° C. for 20 minutes, while flushing with inert gas, in some instances argon and in other instances nitrogen.

Table 1 presents the data for $SO_2$ and NO adsorption at three different temperatures, sorted by the amount of $SO_2$ adsorbed under ambient conditions.

The amount of $SO_2$ adsorbed at ambient conditions by the 18 chars tends to fall in four discrete activity ranks:

| COAL CODE | | |
|---|---|---|
| Rank 1. | Very High | - BB14 and BG05 (Leonardites) |
| Rank 2. | High | - AX33, AE21, BJ02, BL37, AM52, and AA25 |
| Rank 3. | Medium | - BM46, BI35, AG49, BF23, AK39, and BE29 |
| Rank 4. | Low | - AI40, AD43, AF38, and AL27 |

At higher temperatures of operation, the activity ranks are less distinct. For instance at 100° C. for $SO_2$ adsorption, the data for ranks 1 and 4 are distinct but the data for ranks 2 and 3 overlap. Even at ambient conditions, the lower adsorbing NO exhibits an overlap of data. It is important to note that fresh char was prepared for use in the NO adsorption tests and that these fresh chars gave a similar ranking to the chars used in the $SO_2$ tests.

The method used to determine the gas adsorption of the chars provides data that is unique to each char. The $SO_2$ adsorption at ambient conditions on char shows the greatest differences and is therefore the most useful value for determining an activity rank for a char made from a coal.

TABLE 1

| | | | COAL CHAR ACTIVITY WITH $SO_2$ AND NO | | | | | |
|---|---|---|---|---|---|---|---|---|
| Activity Rank | Coal Code | BET Area $m^2/g$ | $SO_2$ Adsorption, wt % at indicated temp | | | $NO_x$ Adsorption, wt at indicated temp | | |
| | | | (Amb) | (100° C.) | (200° C.) | (Amb) | (100° C.) | (200° C.) |
| 1 | BB14 | 197 | 10.48 | 4.45 | 1.69 | 2.12 | 0.99 | 0.44 |
| 1 | BG05 | 179 | 9.41 | 4.69 | 3.85 | 2.03 | 0.47 | 0.47 |
| 2 | AX33 | 176 | 8.70 | 3.37 | 2.71 | 1.68 | C 83 | 0.33 |
| 2 | AE21 | 183 | 8.03 | 3.24 | 1.81 | 1.60 | 0.67 | 0.27 |
| 2 | BJ02 | 184 | 7.83 | 2.88 | 1.98 | 1.25 | 0.82 | 0.62 |
| 2 | BL37 | | 7.45 | 3.33 | 2.69 | 1.23 | 0.42 | 0.46 |
| 2 | AM52 | 217 | 7.22 | 2.20 | 2.17 | 1.86 | 0.76 | 0.69 |
| 2 | AA25 | 181 | 6.68 | 3.06 | 1.67 | 1.61 | 1.06 | 0.51 |
| 3 | BM46 | 200 | 5.99 | 3.34 | 2.34 | 0.77 | 0.60 | 0.50 |
| 3 | BI35 | 190 | 5.92 | 2.63 | 1.81 | 0.93 | 0.33 | 0.46 |
| 3 | AG49 | 187 | 5.85 | 2.27 | 1.47 | 1.39 | 0.40 | 0.49 |
| 3 | BF23 | 206 | 5.80 | 2.52 | 2.12 | 1.15 | 0.62 | 0.50 |
| 3 | AK39 | 177 | 5.77 | 2.72 | 2.24 | 1.50 | 0.38 | 0.42 |
| 3 | BE26 | 186 | 5.65 | 2.28 | 1.25 | 1.51 | 0.41 | 0.41 |
| | German Char | | 3.60 | 0.82 | 0.47 | 3.80 | 0.64 | 0.61 |
| 4 | AI40 | 167 | 3.52 | 1.50 | 0.96 | 1.09 | 0.27 | 0.44 |
| 4 | AD43 | 186 | 2.48 | 1.51 | 1.42 | 0.72 | 0.27 | 0.63 |
| 4 | AF38 | 171 | 2.32 | 1.16 | 0.63 | 0.80 | 0.28 | 0.42 |
| 4 | AL27 | 203 | 1.45 | 0.94 | 0.75 | 1.02 | 0.60 | 0.49 |

The following examples are offered to demonstrate the coal char activity with sulfur dioxide and nitrogen dioxide or the Leonardite present invention in comparison with the conventional available German brown coal (lignite char) and with other coals varying from high rank to low rank.

EXAMPLES

In each of the tests below described, a slow moving gas stream containing 1% of sulfur dioxide and 0.5% of nitric oxide were used.

Mercury adsorption on the char was tested for heavy metal (mercury vapor adsorption) by passing mercury vapor through the char. FIG. 1 shows the mercury adsorption on the char and it demonstrates that char of the present invention, denoted with small black diamonds, does not decrease in mercury adsorption over time, whereas the mercury adsorption dramatically decreased and then remained at a low level for conventional activated carbon.

In sum, it can be seen that if the process the present invention is used, that in fact the less expensive Leonardites can be used to provide flue-gas adsorption filters which have enhanced activity in terms of sulfur dioxide adsorption, nitric oxide adsorptions and heavy metal adsorptions in comparison with high and medium rank coke materials used for similar purposes. Thus, it can be seen that the invention accomplished all of its stated objectives.

What is claimed is:

1. A process of preparing a low rank coal filter material suitable for use in lieu of activated carbon filter materials, and which also provides more efficient filtration of sulfur dioxide and nitric oxides in power plants than do high rank coal filter materials, said method consisting essentially of:

(a) size reducing Leonardite having an oxygen content of from about 30% to about 35% to a small but flue-gas filter effective size; and thereafter, (b) heating said size reduced Leonardite to a temperature within the range of 550° C. to 850° C. in the presence of a flow of inert gas, for a time sufficient to activate said Leonardite as a filter material.

2. The process of claim 1 wherein heating is to a temperature of at least 750° C.

3. The process of claim 1 wherein the inert gas is selected from the group consisting of carbon dioxide, nitrogen and argon.

4. The process of claim 3 wherein the inert gas is selected from argon and nitrogen.

5. The process of claim 1 wherein the time of heating is from about 0.25 hours to about 1.0 hour.

6. The process of claim 5 wherein the time of heating is from about 0.33 hours to about 0.5 hours.

7. The process of claim 1 wherein the Leonardite has a weathered oxygen structure.

* * * * *